United States Patent
Hart

[15] 3,638,491
[45] Feb. 1, 1972

[54] FUEL-GAUGING DEVICE

[72] Inventor: Atlee S. Hart, 8776 Woodside Park Drive, Oak Park, Mich. 48237

[22] Filed: Dec. 4, 1967

[21] Appl. No.: 687,724

[52] U.S. Cl. ........................................................73/304 C
[51] Int. Cl. ..................................................G01f 23/26
[58] Field of Search ..........................73/304 C; 330/17

[56] References Cited

UNITED STATES PATENTS

| | | | |
|---|---|---|---|
| 2,699,523 | 1/1955 | Meyers | 73/304 |
| 2,638,000 | 5/1953 | Sontheimer | 73/304 C |
| 3,161,054 | 12/1964 | Cohn | 73/304 C |
| 3,204,191 | 8/1965 | Redwood | 33/17 |
| 3,339,412 | 9/1967 | Maltby | 73/304 C |

OTHER PUBLICATIONS

Sheingold, Fundamentals of Radio Communications, P. Van Nostrand Co., Inc., Princeton, N.J., 1951

Primary Examiner—S. Clement Swisher
Attorney—Barnes, Kisselle, Raisch & Choate

[57] ABSTRACT

A fuel-gauging device including concentric tubes that are adapted to be mounted within the fuel tank and circuitry positioned within the inner tube and connected to an external gauge. The circuitry includes an oscillator to which direct current is supplied from a source such as the battery of the aircraft through a zener diode. The output of the oscillator is supplied to a capacitance bridge, one leg of which is formed by the concentric tubes. The output of the capacitance bridge is in turn supplied to an amplifier which includes oppositely disposed transistors, namely, a PNP- and NPN-transistor, connected in a manner to compensate for temperature changes in the transistor characteristics. The output of the amplifier is supplied through a voltage divider to the fuel-indicating meter.

Means are provided for metering the flow of fuel into and out of the space between the concentric tubes to provide for a damping action and thereby prevent undue fluttering or erratic action of the fuel-indicating meter.

For use in fuel tanks provided in the wings of airplanes having a substantial dihedral angle, two fuel-gauging sensors are connected in a bridge circuit to operate a single fuel-indicating meter.

18 Claims, 8 Drawing Figures

PATENTED FEB 1 1972

INVENTOR.
ATLEE S. HART
BY
Barnes, Kisselle, Raisch & Choate
ATTORNEYS

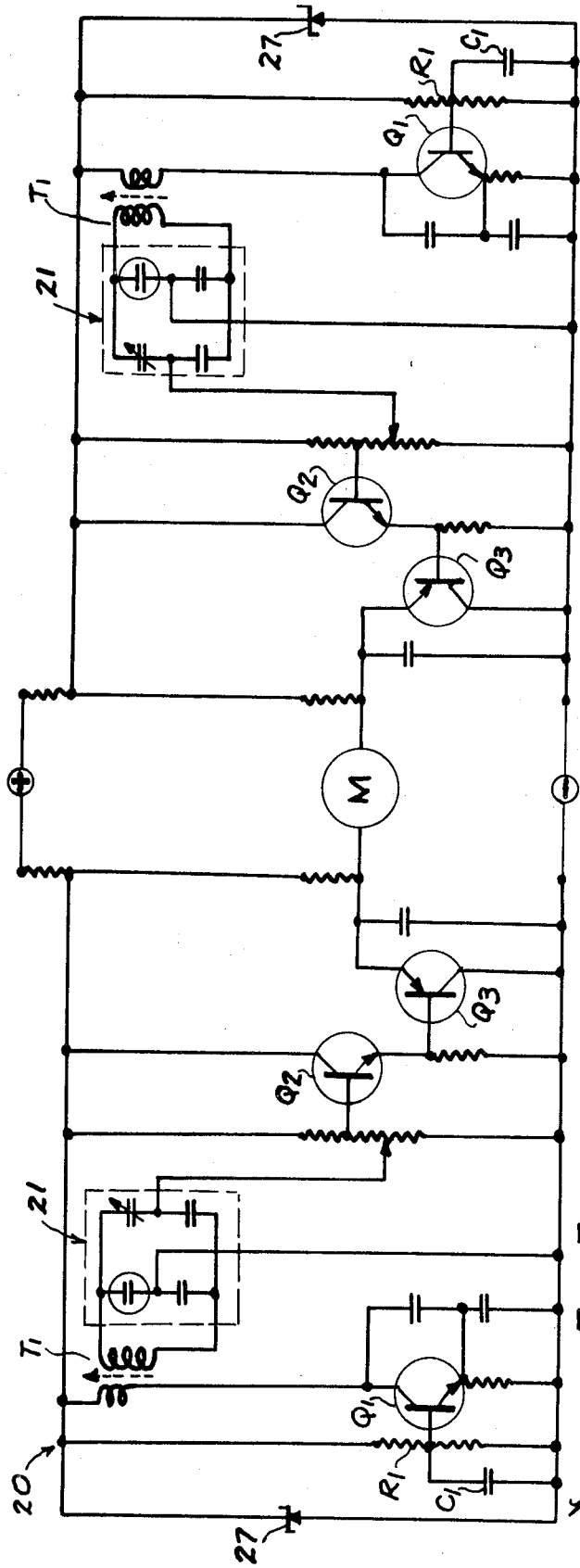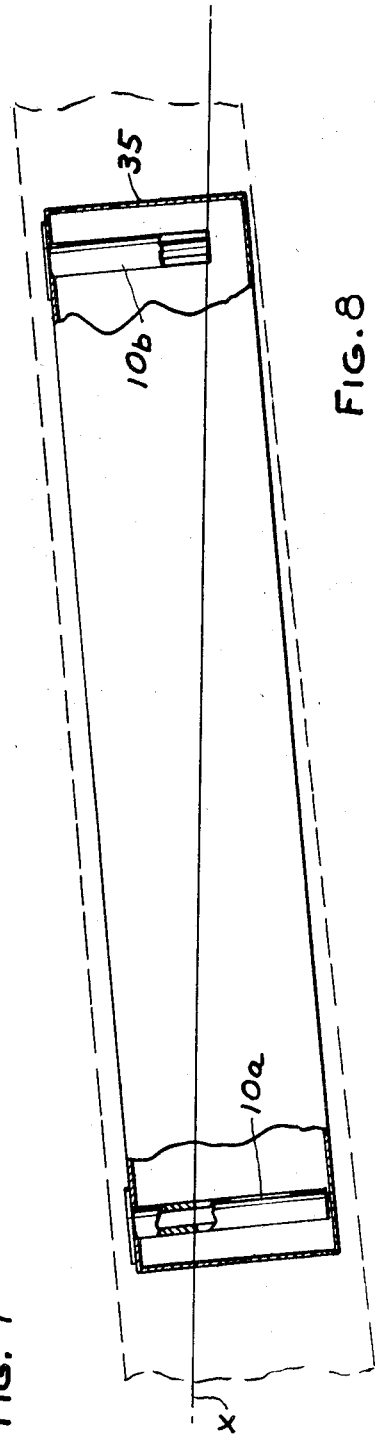
FIG. 7
FIG. 8
INVENTOR.
ATLEE S. HART
BY
Barnes, Kisselle, Raisch & Choate
ATTORNEYS

FUEL-GAUGING DEVICE

BACKGROUND OF THE INVENTION

In fuel-gauging devices for aircraft and the like, it has been common to utilize devices that necessitate a sensor in the fuel tank, external electronics connected to the sensor by long cables and a gauge or the like. Such devices are not only expensive but, in addition, are subject to inaccuracies due to changes in temperature, damage, and are difficult to maintain.

Among the objects of the invention are to provide a fuel-gauging device which is compact, low in overall size and weight, simple to install, eliminates the need for long cables, is rugged and has long service-free life.

A further object of the invention is to provide a fuel-gauging device which includes both voltage regulation and temperature compensation resulting in greater accuracy which is not affected by aging, altitude or humidity.

In prior art float-type fuel-gauging devices, it is common to provide a high-viscosity fluid on the fluid-indicating meter in order to damp the tendency of the fuel-indicating meter to flutter or wiggle during movement of the fuel within the tank as, for example, when the airplane is being taxied along the ground. Such a high-viscosity fluid, which may comprise silicone grease, tends to produce indicator hysteresis error.

A further object of the present invention is to provide a fuel-indicating device which incorporates damping action without hysteresis error.

In aircraft having wings with substantial dihedral angles, the placement of a fuel tank in such wings complicates the problem of determining the fuel level and it has been common to use two or more fuel-gauging sensors in the tank.

Among the objects of the present invention are to provide a novel arrangement of fuel-gauging sensors and a novel circuitry for utilizing two sensors to operate a single fuel-indicating meter.

SUMMARY

The fuel-gauging device disclosed herein comprises concentric tubes that are adapted to be mounted within the fuel tank and circuitry positioned within the inner tube and connected to an external gauge. The circuitry includes an oscillator to which direct current is supplied from a source such as the battery of the aircraft through a zener diode. The output of the oscillator is supplied to a capacitance bridge, one leg of which is formed by the concentric tubes. The output of the capacitance bridge is in turn supplied to an amplifier which includes oppositely disposed transistors, namely, a PNP- and NPN-transistor, connected in a manner to compensate for temperature changes in the transistor characteristics. The output of the amplifier is supplied through a voltage divider to the meter.

Means are provided for metering the flow of fuel into and out of the space between the concentric tubes to provide for a damping action and thereby prevent undue fluttering or erratic action of the fuel-indicating meter.

For use in fuel tanks provided in the wings of airplanes having a substantial dihedral angle, two fuel-gauging sensors are connected in a bridge circuit to operate a single fuel-indicating meter.

DESCRIPTION OF THE DRAWINGS

FIG. 7 is a schematic wiring diagram of a modified form.

FIG. 8 is a sectional view through a fuel tank incorporating two fuel sensors.

DESCRIPTION

Figure 1:
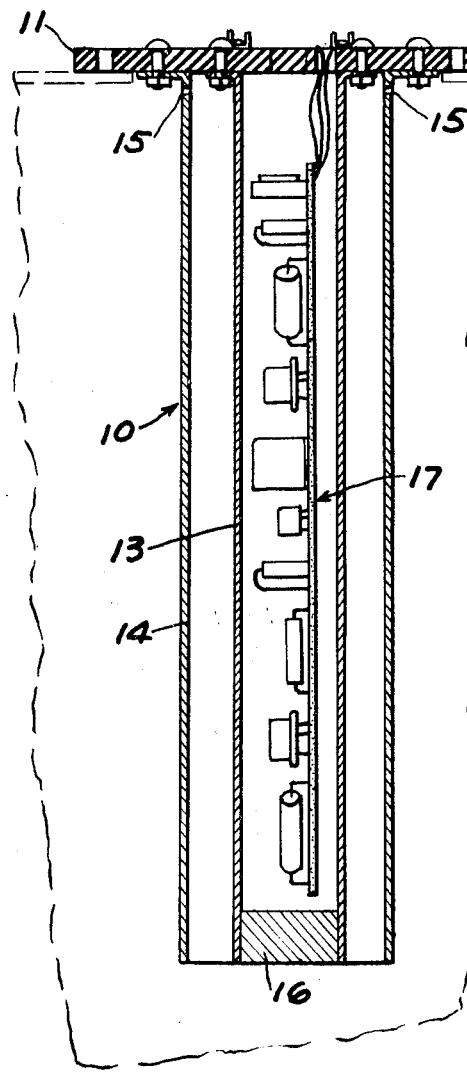
FIG. 1 is a vertical sectional view of a fluid-gauging device embodying the invention.
Figure 2:
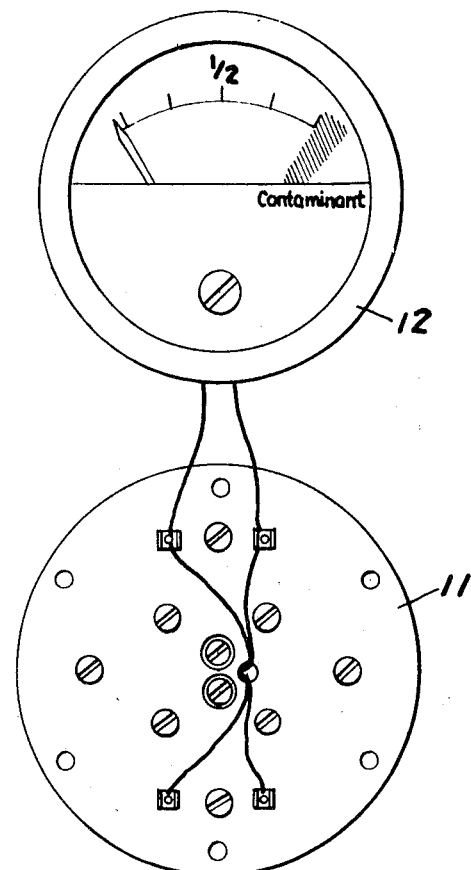
FIG. 2 is a partly diagrammatic plan view of the device.

Referring to FIGS. 1 and 2, the fuel-gauging device embodying the invention comprises a sensor 10 which is adapted to be supported by a mounting flange 11 within the fuel tank and connected by wires to a fuel gauge or indicator 12 on the instrument panel of the aircraft, boat or the like.

Figure 3:
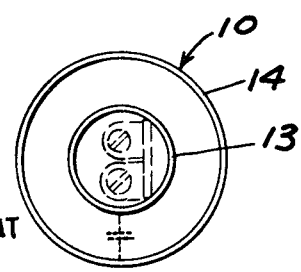
FIG. 3 is a partly diagrammatic bottom plan view of the device.

As shown in FIG. 1, the sensor 10 comprises concentric aluminum tubes 13, 14. The fuel is adapted to rise between the tubes to vary the capacitance (shown schematically in broken lines in FIG. 3) between the tubes as presently described. Ventholes are provided at the upper end of the outer tube 14. The lower end of the inner tube is closed by a plug 16 and the electronic circuit of the gauging device supported on a board 17 within the tube 13.

Figure 4:
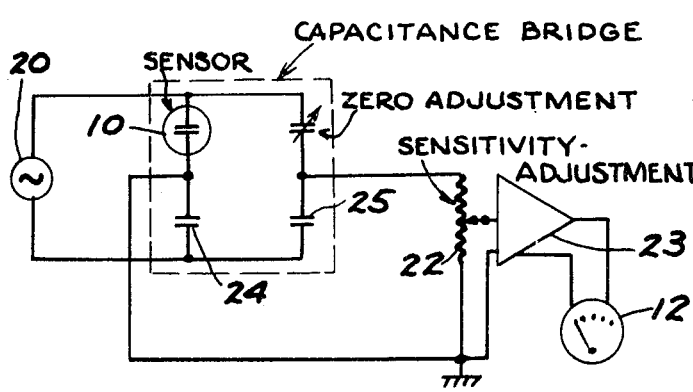
FIG. 4 is a schematic wiring diagram of the device.

The schematic circuit of the fuel-gauging device is shown in FIG. 4 and comprises a high-frequency oscillator 20 that supplies high-frequency current to a capacitance bridge 21, one leg of which is formed by the sensor 10 and more specifically the tubes 13, 14. The output of the bridge 21 is supplied through an adjustable resistor 22 to a temperature- and voltage-stabilized amplifier 23 and through the amplifier to the gauge 12.

The capacitance bridge includes capacitors 24, 25 and an adjustable capacitor 26 that permits the gauging device to be adjusted to zero showing when there is no fuel in the tank.

Figure 5:
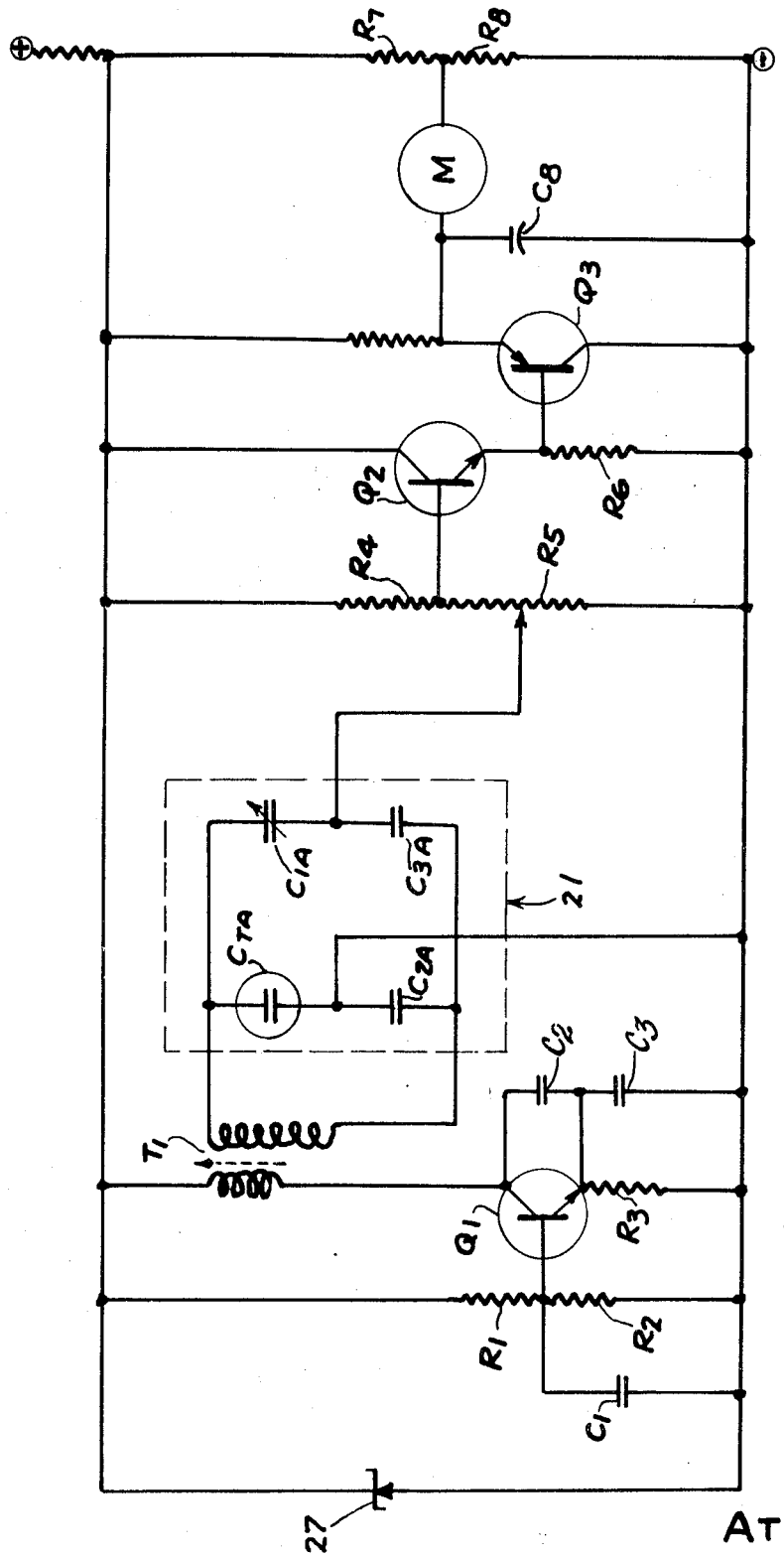
FIG. 5 is an electronic diagram of the device.

Referring more specifically to the circuit diagram shown in FIG. 5, the oscillator 20 includes a zener diode 27 to which direct current is applied from an external source such as a battery of the aircraft or boat. The oscillator proper comprises a Colpitts oscillator including a NPN-transistor $Q_1$, resistors $R_1$, $R_2$, and $R_3$, the primary of a transformer $T_1$, and a voltage divider $C_2$, $C_3$.

The AC voltage generated in the primary of $T_1$ is stepped up through the transformer action and applied to the capacitance bridge 21. The amplifier 23 includes a transistor $Q_2$ and its associated resistors $R_4$, $R_5$, and $R_6$ which form an emitter follower to provide current gain. The transistor $Q_2$ is of the NPN type. Provision of such an emitter follower generates two undesirable effects, namely, (1) the emitter follower output voltage is less than its input voltage and (2) the drop is a temperature variable and as the ambient temperature changes, error is introduced into the signal. To eliminate these two error sources, a second transistor $Q_3$ of the PNP type is connected as a complementary emitter follower. The action of this transistor is such that its voltage drop at the base-emitter junction and temperature variation are equal to an opposite in polarity to those of transistor $Q_2$ resulting in a cancellation of the two undesirable effects.

The output signal from the complementary emitter follower is integrated by capacitor $C_8$ and applied to the meter readout which comprises an ammeter calibrated to indicate fuel level. To eliminate the DC component introduced by the emitter follower, the positive side of the meter is connected to a voltage divider $R_7$, $R_8$. The voltage divider resistors $R_7$ and $R_8$ are of different temperature characteristic materials and the resulting temperature-varying voltage at their juncture is established to provide an extra measure of temperature compensation for the overall circuit.

Figure 6:
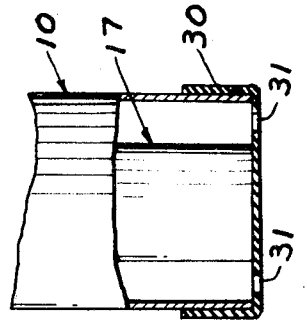
FIG. 6 is a fragmentary sectional view of a modified form of sensor.

In order to provide a damping action and prevent erratic action of the needle of the fuel-indicating meter 11, a cap 30 may be provided over the lower end of the outer tube 14 as shown in FIG. 6. The cap 30 has openings 31 therein which meter the flow of fluid into and out of the space between the tubes 13, 14 and thereby damp the action of the fuel-indicating device without producing hysteresis error. By controlling the size and number of the openings, the damping action can be adjusted from essentially zero to a value well exceeding that of conventional systems. Since the damping is produced in the sensor rather than the indicator, hysteresis errors due to the use of greases and the like on the fuel gauge are completely eliminated.

The fuel sensor embodying the invention has the further advantage of producing a substantial signal when contaminates such as water rise to a point of contact with the lower ends of the tubes. Thus, the presence of water will immediately cause an "overfull" showing upon the meter. This can be accentuated by providing suitable indicia means on the meter as shown by shading in FIG. 2, indicating that contamination is present.

Where the fuel-indicating device is to be used in fuel tanks placed in the wings of aircraft having substantial dihedral angle as shown in FIG. 8, two fuel sensors 10a, 10b are provided in spaced relation in tank 35. One fuel sensor 10a has the upper end of the space between the tubes filled to a horizontal line X so that only the lower end of the sensor 10a is operative. The other sensor 10b has its lower end extending only to the horizontal line X. Thus, one sensor is effective for measuring the level below the common line X while the other is effective for measuring the level above the common line X.

The fuel-sensing devices 10a, 10b are connected in a circuit to allow operation of a single readout device, such as a meter, from the two sensors 10a, 10b in a cumulative manner. Specifically, it is desired to have sensor number 10a drive the indicator from zero reading to some fraction of full scale, and to have sensor 10b drive the indicator from said fraction to full scale.

The circuit for achieving this result is shown in FIG. 7 and comprises two bridge circuits, each of which has one of the sensors therein connected by an interconnecting bridge. Considering first the left-hand bridge circuit shown in FIG. 7 with the transistor amplified, neglecting the base-emitter drop of the transistor $V_{BE}$, the output voltage, $V_{01}$ will be equal to the bridge output voltage, $V_1-V_2$. If the bridge is balanced, ($C_T/C_2 = C_1/_3$) then, of course, $V_1-V_2=0$ and $V_0=0$. Assume that the capacitive sensor $C_T$ has a quiescent capacitance of $C_{T1}$ and as it makes a measurement it increases in capacitance from $C_T$ to $C_{T1}+\Delta C$. This change in capacitance $\Delta C$ will cause the bridge output voltage to change from zero to some $V_{01}$. $V_{01}$, then, is the $\Delta V_0$ which results from $\Delta C$. Next, consider the bridge to be unbalanced by the adjustable capacitor $C_1$ such that with the sensor capacitance equal to $C_{T1}$ the output voltage is $V_{02}$. Now if the sensor undergoes a change $\Delta C$, the output voltage will change by $V_{01}$ and will change from $V_{02}$ to $V_{02}+V_{01}$, i.e., the magnitude of $V_0$ increases.

If, now, the adjustable capacitor $C_1$ is set to unbalance the bridge in the opposite direction so that the output voltage is also $V_{02}$, the change in capacitance from $C_{T1}$ to $C_{T1}+\Delta C$ will make the output voltage change from $V_{02}$ to $V_{02}-V_{01}$ which means that the magnitude of $V_0$ decreases by $V_{01}$.

Thus the bridge circuit can be set to some output voltage and have said output voltage either increase or decrease as a sensor undergoes a given change, according to in which direction we unbalanced the bridge.

By connecting two bridge circuits in the manner shown in FIG. 7, the desired control of the readout can be achieved.

Thus if one bridge circuit is unbalanced such that its output voltage is $V_{01B}$ and the other bridge circuit is unbalanced in the other direction such that the output voltage is $V_{01A}$; since the voltages on each side of the meter are equal, no current will flow and the meter will not deflect. Now, if $C_{TA}$ becomes $C_{TA}+\Delta C_{TA}$ $V_{01A}$ will increase to $V_{01A}+\Delta V_{01A}$, and since the magnitude of this is greater than $V_{01B}$, a current will be driven through the meter from left to right and cause upward deflection of the meter. If the sensitivity of the meter and/or the amplifier are adjusted so that this deflection of the meter will be to that fraction of full scale that $C_{TA}$ is to measure. If now, $C_{TB}$ becomes $C_{TB}+\Delta C_{TB}$, then $V_{01B}$ becomes $V_{01B}-\Delta V_{01B}$ which is lower in potential than $V_{01A}+\Delta V_{01A}$. The left to right current through the meter will again increase causing a further deflection of the meter in the same direction as before. The sensitivity of the right-hand amplifier is adjusted so that the meter is now deflected from the original fraction to full scale. The system thus comprises two bridge circuits whose outputs are interconnected in another bridge circuit, the two bridge circuits being initially unbalanced in opposite directions so that like changes in sensors in the two bridge circuits will produce a cumulative indication in an indicator placed in the interconnecting bridge. The four legs of the interconnecting bridge are $Q_1$, $Q_2$, $R_A$, and $R_B$.

I claim:

1. In a fuel-gauging device, the combination comprising
a sensor comprising two telescoped tubes,
means for supporting said tubes within a fuel chamber or the like,
and circuitry completely positioned within the inner tube and adapted to be connected to an external source of energy,
said circuitry including said tubes and being responsive to the change in capacitance of said tubes due to varying fuel level,
and fuel indicator means externally of said tubes connected to said output circuiting for producing a signal proportional to the level of fuel,
said circuitry comprises
a capacitance bridge circuit,
one leg of said bridge circuit being connected to said inner and outer tubes,
said circuitry includes means for converting said external energy to high-frequency energy,
said capacitance bridge circuit being connected to said high-frequency energy,
said circuitry includes
an amplifier connected to the output of said bridge circuit,
said amplifier being connected to said external fuel indicator means,
said amplifier comprises a first NPN-transistor to the base of which the output of said capacitance bridge circuit is connected and a PNP-transistor which has its base connected to the emitter of the NPN-transistor,
a voltage divider being connected to the collector of said PNP-transistor,
said external means comprising an ammeter calibrated for indicating fluid and connected to the emitter of said PNP-transistor and between the resistors of said voltage dividers.

2. The combination set forth in claim 1 wherein said voltage divider comprises two resistors having different temperature characteristics.

3. The combination set forth in claim 1 including a voltage divider connected to the output of said amplifier,
said external means being connected to said voltage divider.

4. The combination set forth in claim 3 wherein said voltage divider comprises two resistors of dissimilar temperature characteristics.

5. In a fuel-gauging device, the combination comprising
a sensor comprising two substantially concentric tubes,
means for supporting said tubes within a fuel chamber or the like,
and circuitry completely positioned within the inner tube,
said inner tube having its lower end closed,
said circuitry including a source of high-frequency energy, adapted to be connected to an external source of power,
a capacitance bridge circuit,
one leg of said bridge circuit being connected to said inner and outer tubes, and
an amplifier,
and fuel-indicating means externally of said tubes connected to the output of said amplifier,
said amplifier comprises a first NPN-transistor to the base of which the output of said capacitance bridge is connected and a PNP-transistor which has its base connected to the emitter of the NPN-transistor,
a voltage divider being connected to the collector of said PNP-transistor,
said fuel-indicating means comprising an ammeter calibrated for indicating fluid and connected to the emitter of said PNP-transistor and between the resistors of said voltage dividers.

6. The combination set forth in claim 5 wherein said voltage divider comprises two resistors having different temperature characteristics.

7. The combination set forth in claim 1 including a voltage divider connected to the output of said amplifier,
said fuel-indicating means being connected to said voltage divider.

8. In a fuel-gauging device, the combination comprising
a sensor comprising two substantially concentric tubes,
means for supporting said tubes within a fuel chamber or the like,
and circuitry completely positioned within the inner tube,
said inner tube having its lower end closed,
said circuitry including a source of high-frequency energy, adapted to be connected to an external source of power,
a capacitance bridge circuit,
one leg of said bridge circuit being connected to said inner and outer tubes, and
an amplifier,
and fuel-indicating means externally of said tubes connected to the output of said amplifier,
a voltage divider connected to the output of said amplifier,
said fuel-indicating means being connected to said voltage divider.

9. The combination set forth in claim 8 wherein said voltage divider comprises two resistors of dissimilar temperature characteristics.

10. In a fuel-gauging device adapted for usage with a fuel tank positioned in the wing of an aircraft having substantial dihedral angle, the combination comprising
a pair of sensors,
each of the sensors comprising two telescoped tubes and means for supporting said tubes within said fuel tank,
and circuitry positioned within the inner tube and adapted to be connected to an external source of energy,
said circuitry including said tubes and being responsive to the change in capacitance of said tubes due to varying fuel level,
one of said sensors having its tubes extending downwardly within said tank a greater distance than the other,
said one sensor having a space between said tubes above a common horizontal line filled so that fuel will not move upwardly therein,
the other of said sensors having the lower ends of its tubes extending to said common horizontal line,
and a fuel indicator device externally of said tubes,
and additional circuitry connecting said fuel indicator device to the circuitry within each of said sensors in a manner such that the presence of a fuel between the tubes of either of said sensors causes the indicator of said fuel indicator device to move in the same direction.

11. The combination set forth in claim 10 wherein the circuitry in each of said tubes comprises
a capacitance bridge circuit,
one leg of said bridge circuit being connected to said inner and outer tubes.

12. The combination set forth in claim 11 wherein said bridge circuit are adjusted so that they are normally unbalanced in opposite directions.

13. The combination set forth in claim 12 wherein each said circuitry includes
an amplifier connected to the output of said bridge circuit.

14. The combination set forth in claim 13 wherein each said amplifier comprises oppositely connected transistors.

15. The combination set forth in claim 14 wherein each said amplifier comprises a first NPN-transistor to the base of which the output of said capacitance bridge is connected and an PNP-transistor which has its base connected to the emitter of the NPN-transistor.

16. The combination set forth in claim 15 wherein each said circuitry includes a voltage divider connected to the collector of said PNP-transistor,
said external means comprising an ammeter calibrated for indicating fluid and connected to the emitter of said PNP-transistor and between the resistors of said voltage dividers.

17. The combination set forth in claim 16 wherein each said voltage divider comprises two resistors having different temperature characteristics.

18. In a fuel-gauging device adapted for usage with a fuel tank positioned in the wing of an aircraft having substantial dihedral angle, the combination comprising
a pair of sensors,
each of the sensors comprising two telescoped tubes and means for supporting said tubes within said fuel tank,
and circuitry adapted to be connected to an external source of energy,
said circuitry including said tubes and being responsive to the change in capacitance of said tubes due to varying fuel level,
one of said sensors having its tubes extending downwardly within said tank a greater distance than the other,
said one sensor having a space between said tubes above a common horizontal line filled so that fuel will not move upwardly therein,
the other of said sensors having the lower ends of its tubes extending to said common horizontal line,
and a fuel indicator device externally of said tubes,
and additional circuitry connecting said fuel indicator device to the circuitry within each of said sensors in a manner such that the presence of a fuel between the tubes of either of said sensors causes the indicator of said fuel indicator device to move in the same direction.

* * * * *